(12) United States Patent
Rejkowski et al.

(10) Patent No.: US 12,179,554 B1
(45) Date of Patent: Dec. 31, 2024

(54) METHOD AND SYSTEM FOR CONTROLLING AND DIAGNOSING A CLIMATE CONTROL SYSTEM

(71) Applicants: Michael W. Rejkowski, Carrollton, TX (US); Robert K. Bingham, Keller, TX (US); Jeremy D. Smith, Olathe, KS (US)

(72) Inventors: Michael W. Rejkowski, Carrollton, TX (US); Robert K. Bingham, Keller, TX (US); Jeremy D. Smith, Olathe, KS (US)

(73) Assignee: Classic Auto Air Manufacturing LP, Beachwood, OH (US)

( * ) Notice: Subject to any disclaimer, the term of this patent is extended or adjusted under 35 U.S.C. 154(b) by 0 days.

(21) Appl. No.: 18/214,705

(22) Filed: Jun. 27, 2023

Related U.S. Application Data (63) Continuation of application No. 17/107,395, filed on Nov. 30, 2020, now Pat. No. 11,724,564, which is a continuation of application No. 15/342,040, filed on Nov. 2, 2016, now abandoned.

(60) Provisional application No. 62/249,600, filed on Nov. 2, 2015.

(51) Int. Cl.
*B60H 1/00* (2006.01)

(52) U.S. Cl.
CPC ..... *B60H 1/00735* (2013.01); *B60H 1/00792* (2013.01); *B60H 1/00978* (2013.01); *B60H 1/00985* (2013.01)

(58) Field of Classification Search
CPC ............ B60H 1/00735; B60H 1/00792; B60H 1/00978; B60H 1/00985
See application file for complete search history.

(56) References Cited

U.S. PATENT DOCUMENTS

| | | | | |
|---|---|---|---|---|
| 4,420,033 A | * | 12/1983 | Franz | G05D 23/275 236/87 |
| 5,009,076 A | * | 4/1991 | Winslow | G05D 23/19 62/209 |
| 5,234,050 A | * | 8/1993 | Weigert | G05D 23/1913 454/75 |
| 5,294,050 A | * | 3/1994 | Hoffman | B60H 1/00885 237/12.3 A |

(Continued)

*Primary Examiner* — Ramsey Refai (57) ABSTRACT

A system and method for controlling and diagnosing an automotive climate control or environmental system with an electronic or mobile device is disclosed. The system provides for wireless control between the system controllers and an electronic device, such as an electronic device or computer, with instructions executed on a processor to display on the electronic device or the computer-human interface display device with a user interface region or a graphical user interface. Using wireless technology features of an electronic device, the automotive climate control system is wirelessly controlled from the electronic device containing software connected with the climate control system software and firmware mounted within the vehicle that rotates servo motors, and operates fan speed and compressor activity. The user interface regions may be used to create preset, predetermined desired positions of system mode, temperature, fan speed, and the display color and appearance of the user interface region.

5 Claims, 6 Drawing Sheets

(56) References Cited

U.S. PATENT DOCUMENTS

| | | | |
|---|---|---|---|
| 6,629,420 B2* | 10/2003 | Renders | B60H 1/00585 |
| | | | 62/127 |
| 6,631,618 B2 | 10/2003 | Renders | |
| 9,439,082 B2* | 9/2016 | Fischer | H04M 3/22 |
| 10,046,618 B2* | 8/2018 | Kirsch | B60W 40/08 |
| 10,249,182 B1* | 4/2019 | Turner | G06F 8/61 |
| 2001/0041956 A1* | 11/2001 | Wong | B60R 16/0315 |
| | | | 718/107 |
| 2005/0021190 A1* | 1/2005 | Worrell | B60K 35/00 |
| | | | 701/1 |
| 2007/0144723 A1* | 6/2007 | Aubertin | F24F 11/30 |
| | | | 236/49.3 |
| 2011/0037725 A1 | 2/2011 | Pryor | |
| 2012/0164989 A1 | 6/2012 | Xiao | |
| 2015/0127215 A1* | 5/2015 | Chatterjee | B60H 1/00642 |
| | | | 701/1 |
| 2015/0185030 A1* | 7/2015 | Monroe | B60W 50/14 |
| | | | 701/532 |
| 2015/0210287 A1 | 7/2015 | Penilla | |
| 2016/0214621 A1* | 7/2016 | Baalu | H04W 4/70 |
| 2017/0036511 A1* | 2/2017 | Lee | B60W 40/08 |
| 2018/0147913 A1* | 5/2018 | Bergin | B60H 1/00657 |

* cited by examiner

METHOD AND SYSTEM FOR CONTROLLING AND DIAGNOSING A CLIMATE CONTROL SYSTEM

CROSS REFERENCE TO RELATED APPLICATION

This application claims the benefit of Provisional U.S. Patent Application No. 62/249,600, filed Nov. 2, 2015, the subject matter of which is incorporated herein by reference.

TECHNICAL FIELD

The technology described herein relates generally to a method and system for controlling and diagnosing a climate control system, and more particularly to a system and method for wirelessly controlling and diagnosing an automotive climate control system with an electronic or mobile device having a graphical user interface.

BACKGROUND

The use of air conditioning systems within vehicles is a relatively recent addition. It was not until about 1953 when luxury cars began providing an optional air conditioning system as original equipment. In 1954 a more efficient and affordable air conditioning unit was eventually mass produced for the auto industry, with improved performance and fuel economy. However, as comfortable as air conditioning was known to be, it was not a frequently ordered accessory until the late 1970's, when it became the reliable and efficient system in use today. As a result, many older, restored and rebuilt vehicles do not have air conditioning systems. Moreover, some of the older vehicles which did include early air conditioning systems are in need of repair or replacement.

The use of air conditioning system kits for installation in older vehicles has arisen to provide a solution to the problem of adding or replacing air conditioning systems in these older vehicles. Numerous problems exist with respect to such installation and replacement kids. Original parts are not available or desirable in such systems, since modern electronic components can provide such an improvement in system performance. The appearance and mounting of air conditioning systems may also be problematic for old car hobbyists, who desire to retain the original appearance and operation of their historical vehicles. As a result, it is often undesirable to add new or replacement heating and air conditioning controls to a historical vehicle which did not originally have such controls. An improved method and system for controlling and diagnosing an automotive climate control system with an electronic or mobile device may be desirable.

SUMMARY

A system and method for controlling and diagnosing an automotive climate control or environmental system with an electronic or mobile device is disclosed. The system provides for wireless control between the system controllers and an electronic device, such as a mobile or wearable device or computer, with instructions executed on a processor to display on the electronic device or the computer-human interface display device with a user interface region or a graphical user interface. Using the wireless technology features of an electronic device, such as Bluetooth® technology, the automotive climate control system is wirelessly controlled from the electronic device containing software connected with the climate control system software and firmware mounted within the vehicle that rotates servo motors, and operates fan speed and compressor activity. The user interface regions may be used to create preset, predetermined desired positions of system mode, temperature, fan speed, and the display color and appearance of the user interface region.

The graphical user interface region includes a dial configured for an input to be received via the user interface region, where the input is an interaction on the dial that selects a choice of output, such as to control the mode of air locations within the automotive climate control system, for example, between automotive dash mounted vents, dash mounted defrost and/or floor outlets. Additionally, an input is received via a user interaction within the user interface region using a dial to control temperature within the automotive climate control system, such as to select a desired temperature between cold and hot positions, and providing continuous selective control between these positions. Still further, an input is received via an interaction on a dial to control blower fan speeds within the automotive climate control system, in order to adjust air volume from a fan off position to a high fan speed position, and providing continuous selective control of fan speed between these positions.

The system for diagnosing the automotive climate control system also discloses diagnosing servo motor degree positions within the system, diagnosing problems with compressor engagement and compressor operation within operating limits, and monitoring system refrigerant pressures within the automotive system via sensors.

The system further includes calibration of the automotive climate control system servo motors to electrically mark and store instructions configured to cause data processing apparatus or firmware to perform operations on the system components, such as electrically marking extreme open and closed positions and providing notification in the event any servo motors move beyond these positions or fail to meet extreme positions during operation.

DETAILED DESCRIPTION

Figure 1:
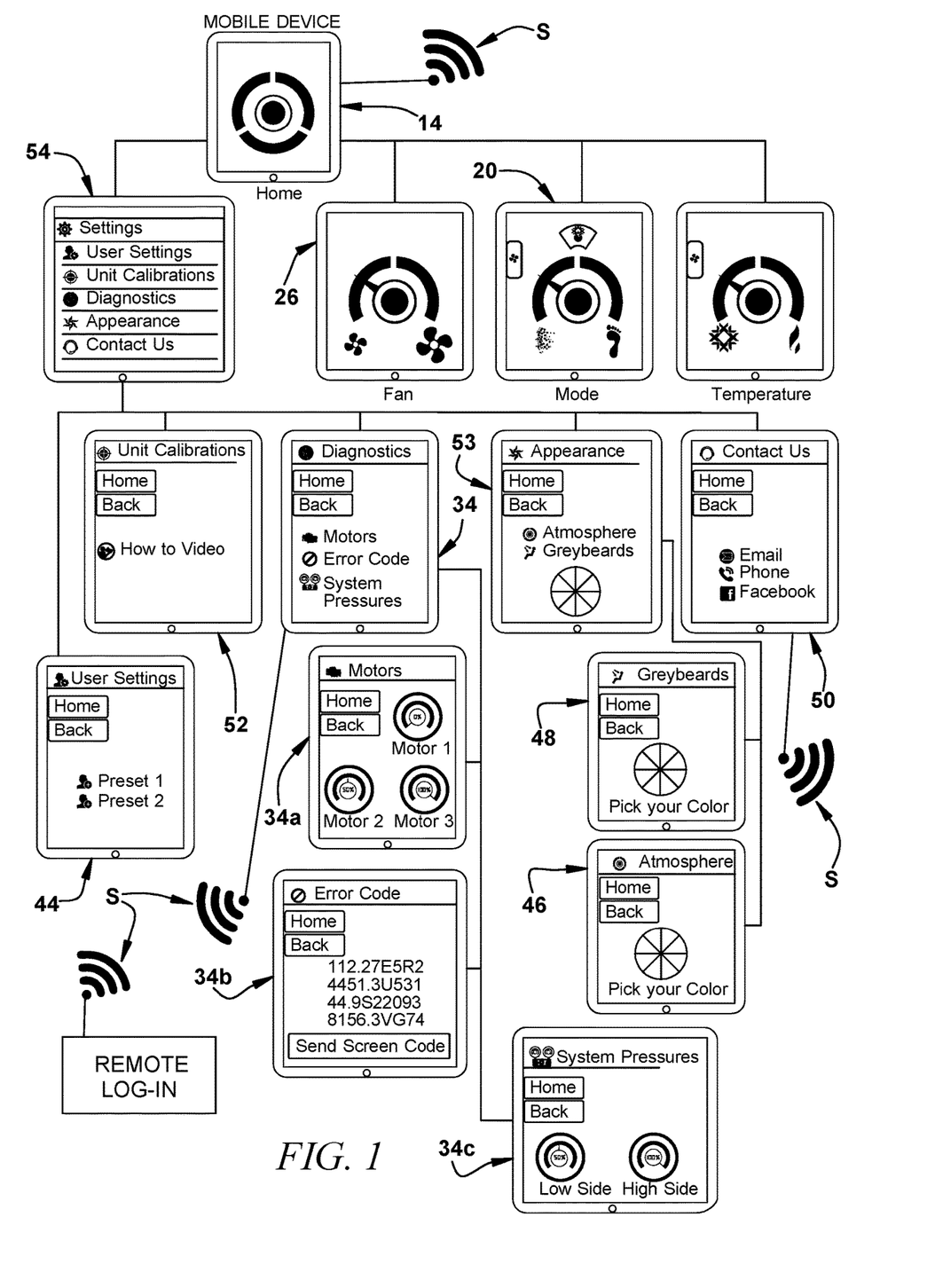
FIG. 1 depicts a block diagram of an example system including a graphical user interface (GUI) for wirelessly controlling and diagnosing an automotive climate control system with an electronic or mobile device.

A method and system 10 for wirelessly controlling and diagnosing an automobile climate control system 12 using an electronic mobile device is disclosed in this application. The electronic device 14 may be of any commonly known electronic devices, such as Android devices, as well as iPhone®, iPad® or Apple Watch devices of the type manufactured and sold by Apple, Inc. of California. The electronic devices 14 make use of the Apple iOS operating system, or other operating systems having wireless technology, such as Bluetooth® capabilities, enabling wireless signal communication S between the electronic devices 14 and system 10 for interacting with the automobile climate control system 12 via an electronic control module 22. The control software disclosed in the present application may be downloaded via the internet accessible Apple® App Store, for example. Illustrations of the screen images of the software which are displayed on electronic devices 14 for operating the system 10 are shown in FIG. 1. In order to provide control and adjustment of the automotive climate control system 12 wirelessly from a mobile device 14, system 10 software is provided and wirelessly connected with automotive climate control system 12 software and firmware within the electronic control module 22, which is interconnected with the climate control system 12 via a wiring harness H to the fan motor and various servo motors that rotate the servo motors in order to operate fan speed, vent outlets and adjust compressor activity. It should be understood that conventional heating, ventilating and air conditioning system components used in the system 12 are well known in the art, for example a condenser, compressor, evaporator components, duct work, fans, servo motors and refrigerant lines are all illustrated in FIGS. 2 through 6, and thus their operation is not discussed in further detail.

The automotive climate control system 12 includes multiple air outlet locations 16 such as automotive dash mounted vents 17, dash mounted defrost 18 and/or floor 19 outlets. The designation of which air location(s) is/are selected to be operated is generally referred to as system mode, control of which is wirelessly enabled from a mobile device 14 using the system mode 20 selection software instructions or a computer-program product for processing user inputs and system sensor inputs, and adjusting components of the system 12 based upon the user and sensor inputs provided via the electronic control module 22. The user provides desired input to the system 10 to adjust to the different modes or functionality of the climate control system 12. For example, by tapping the desired DASH, FLOOR, or DEFROST icons, represented by the face, foot or windshield, respectively, in the mode 20 selection screen, or by simply dragging or moving the dial or pointer P to the desired location within the graphical user interface region on the touch screen of the electronic device 14, as shown in FIG. 1. Input instructions are communicated wirelessly via the electronic control module 22 to make necessary and desired physical adjustments to the vehicle climate system 12 components, and move the air location to the corresponding dash mounted vents 17, defrost outlets 18 or floor outlets 19, using the respective interconnected dash servo, defrost servo and floor servo motors 30 shown in FIG. 3.

Figure 5:
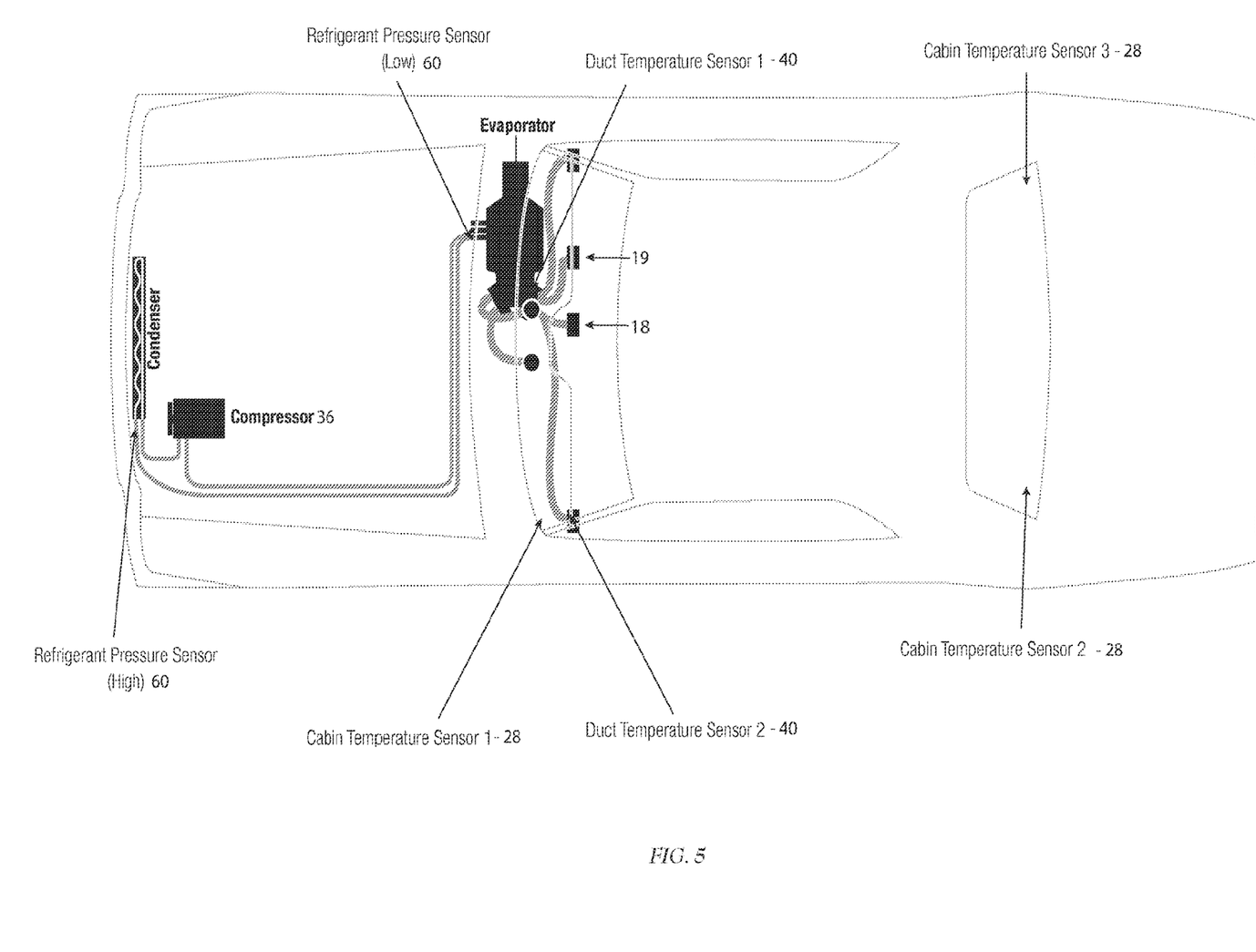
FIG. 5 schematically illustrates the system components in FIG. 2 through FIG. 4 located within an automotive vehicle.
Figure 6:
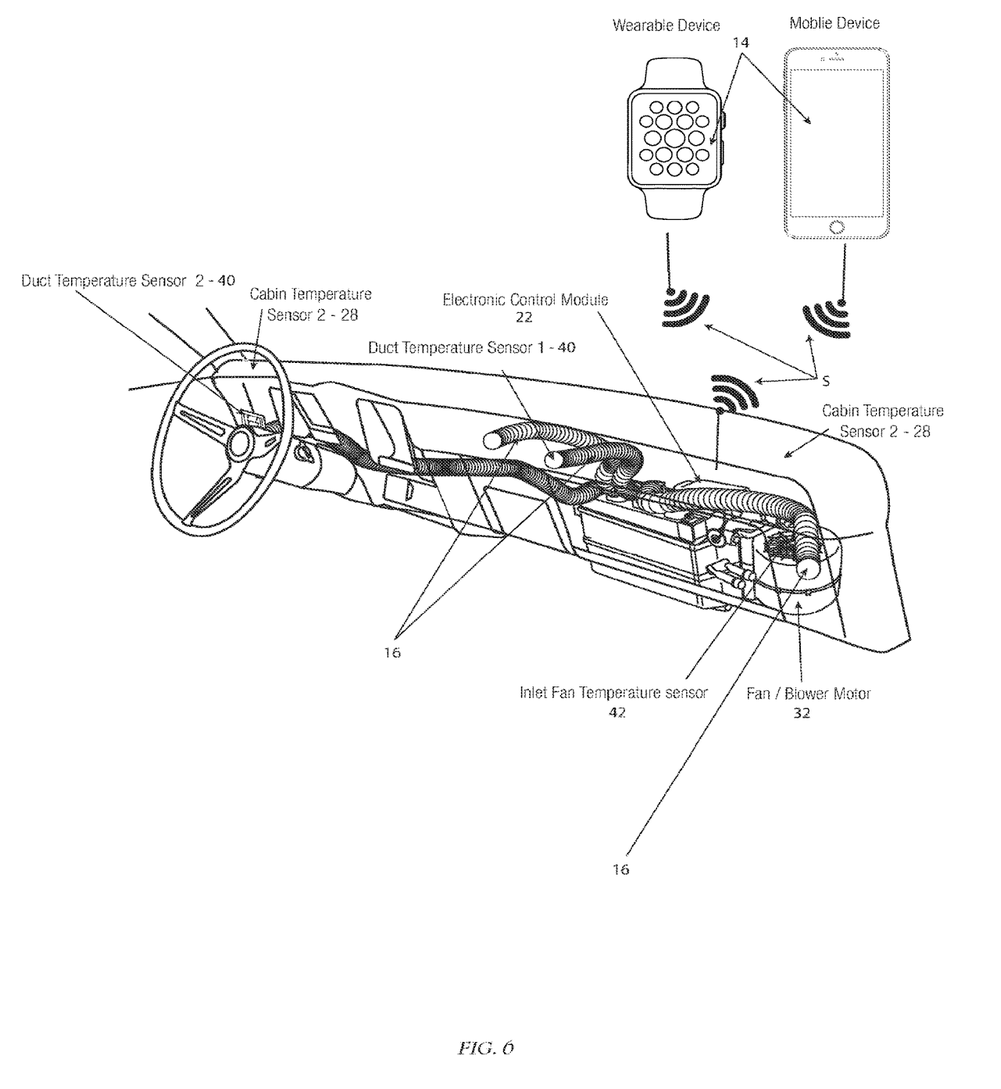
FIG. 6 schematically illustrates system components in FIG. 2 through FIG. 5 located within a dash mount of an automotive vehicle for communication with an electronic device such as a mobile and/or wearable device.

Another aspect of the automotive climate control system 12 which may be controlled and adjusted by features of the system 10 via the interconnected electronic control module 22, is temperature control. Variable movement between cold to hot positions is provided, which may be preset or adjusted wirelessly using the system GUI. The user provides desired input to the system 10 to adjust the temperature by tapping a location between the HOT/COLD icons, illustrated as a flame/snowflake on the temperature selection screen 24 shown in FIG. 1, or simply dragging the dial or pointer to the desired location along the temperature gradient illustrated in the graphical user interface temperature selection region 24 using the touch screen of the electronic device 14. Input instructions are then communicated wirelessly to the electronic control module 22 to make necessary and desired physical adjustments to the vehicle climate control system 12 components, and increase or decrease warm or cool air provided to the vehicle interior using the interconnected temperature control servo motor 29, heating and air conditioning systems schematically shown in FIGS. 2-5. Additional feedback regarding the need for climate control system 12 adjustments is provided to the electronic control module 22 regarding the temperature within the vehicle interior via temperature sensors 28 positioned at various locations. As schematically shown in FIGS. 5 and 6, multiple cabin or interior vehicle temperature sensors 28 may be provided at desired locations for communicating sensed temperature levels within the vehicle to the electronic control module 22. Additionally, temperature levels within the vehicle climate control system 12 components are also monitored and provided to the electronic control module 22 to further support efficient operation of the system 10 to the desired user settings. Such internal temperature sensors 40 are provided to measure the temperature of air leaving duct work behind the vehicle dashboard, as shown in FIGS. 5 and 6. The temperature of air entering the fan/blower motor 32 is also measured at an inlet fan temperature sensor 42. Coil temperature sensors 43 are also provided to measure refrigerant temperatures, as shown schematically in FIG. 4.

Another feature of the automotive climate control system 12 which may be controlled and adjusted by the system 10 includes blower fan speeds to adjust air volume provided to a vehicle interior. Using the fan speed selection screen 26, fan speeds may be changed from off position to high position. The user provides desired input to the system to 20 adjust the fan blower by tapping the LOW/HIGH icon or simply dragging the dial or pointer P to the desired location along the fan speed gradient illustrated in the graphical user interface region of the touch screen of the electronic device 14, which input instructions are then communicated to make necessary and desired physical adjustments to the vehicle system 12 components, and to increase or decrease the speed of the fan/blower motor 32 to increase or decrease the volume of air provided to the vehicle interior using the interconnected servo motors, as shown schematically in FIG. 3.

The present system 10 also provides diagnostic information regarding servo motor degree positions within the climate control system 12. Diagnosis within the system is provided to continuously monitor system 12 servo motors for, or rotation of, motor calibration data which is saved within the system to ensure proper operation within the desired parameters. Information is provided within the system 10 via an electronic device 14 using diagnostic screens 34, 34*a*. If the servo motors 29, 30 fail to meet or exceed calibrated rotation, system software will wirelessly disable the malfunctioning servo motor and send a failure code to a diagnosis screen 34*b* of the electronic device GUI that can be sent via email or other electronic communication, or remotely obtained by a remote technical support team in order to obtain a system repair.

Diagnosis of an automotive climate control system 12 problem with compressor 36 engagement is also enabled by the present system. A menu screen 54 is provided via the electronic device 14 to access more detailed aspects of system 10 control. Using sensors, the system continuously monitors system compressor activity within the automotive climate control system 12 making certain that the compressor is operative or operating in correct mode and temperature positions defined and stored within the software. If compressor 36 activity is not within correct limits, software enabled within the electronic control module 22 will wirelessly send a failure code to a diagnosis screen 34 of the electronic device GUI that can also be emailed or remotely obtained by a remote technical support team in order to obtain a system repair, using contact screen 50.

Figures 2, 2A, 2B, 2C:
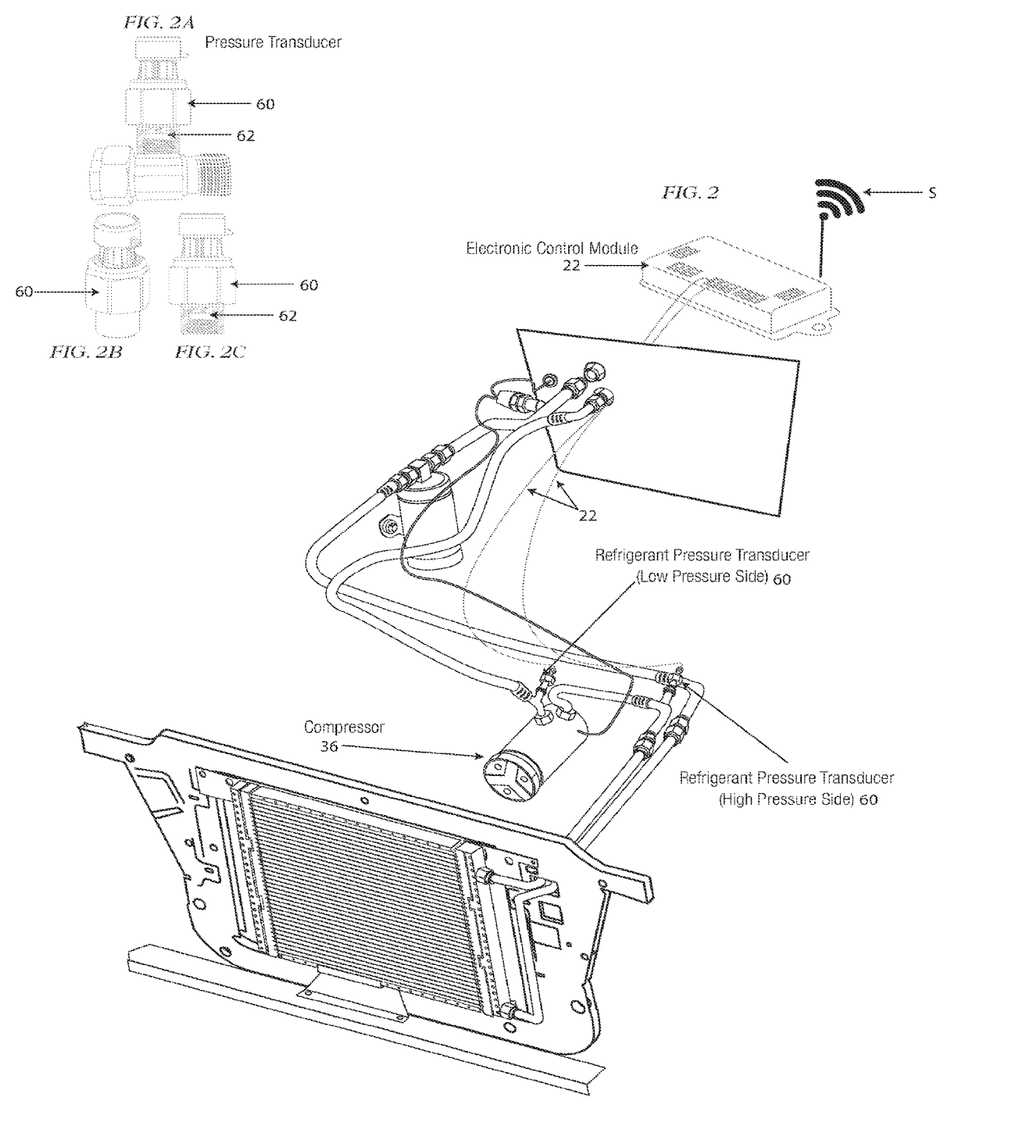
FIG. 2 schematically illustrates sensors positioned within the climate control system for detecting compressor and pressure operation within the system.
FIG. 2A schematically illustrates a cut-away view of a pressure transducer containing a pressure sensor mounted in the system for detecting compressor and pressure operation within the system.
FIG. 2B illustrates a perspective view of the pressure transducer of FIG. 2A for detecting compressor and pressure operation within the system.
FIG. 2C illustrates a cut-away side view of the pressure transducer of FIG. 2B for detecting compressor and pressure operation within the system.
Figure 3:
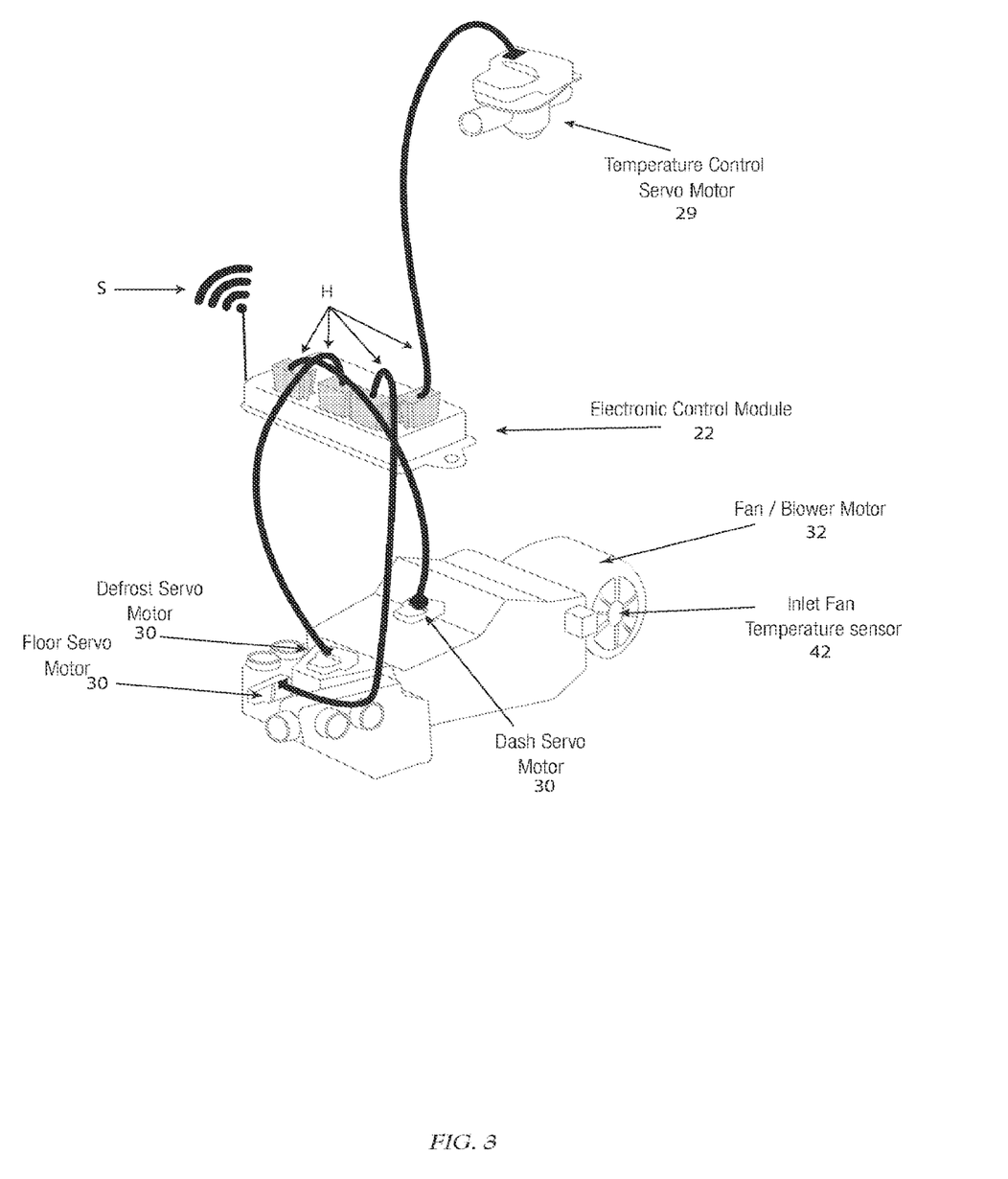
FIG. 3 schematically illustrates an electronic control module interconnected within components of the automotive climate control system via a wiring harness for controlling servo motor operation and detecting sensors for adjusting temperature controls, fan speeds and defrost controls.
Figure 4:
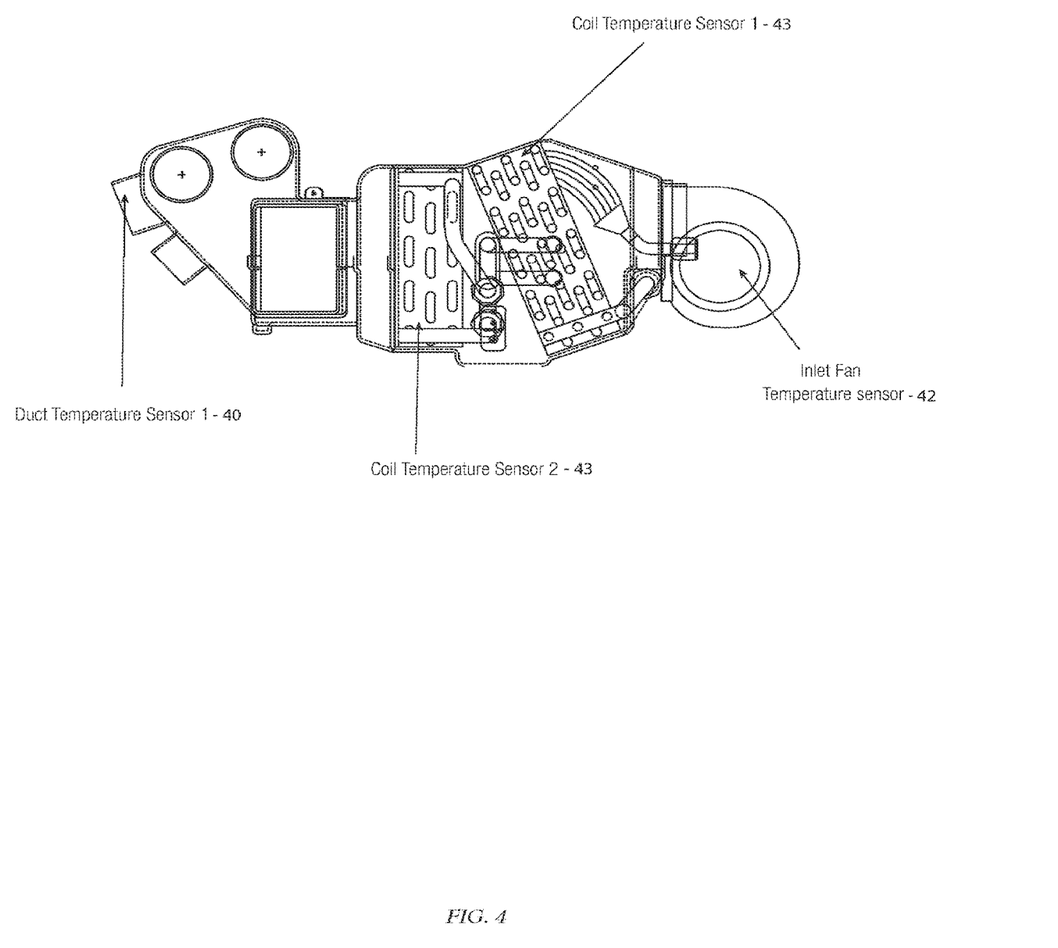
FIG. 4 schematically illustrates temperature sensors positioned within the automotive climate control system for controlling and diagnosing temperature aspects of system operation.

Diagnosing an automotive climate control system 12 problem with refrigerant pressures is also enabled by this present system 10. Using pressure transducers 60 containing sensors 62, within the heating and air conditioning components of the climate control system 12, the system 10 continuously monitors system 12 refrigerant pressures making certain refrigerant pressures are within acceptable ranges stored and defined within the software. If system pressure values are not within acceptable low and high values, software within the electronic control module 22 will wirelessly disengage compressor voltage and send a failure code to a diagnosis screen 34 of the electronic device GUI that can be emailed or remotely obtained by a remote technical support team in order to obtain a system repair. The preferred pressure transducers 60 are in line with the refrigerant conduit, and include electrically connected sensor devices with piezoresistive sensing technology of the type commercially available from Honeywell, such as a PX3 Series product, as shown in FIGS. 2, 2A-2C. Such pressure transducers enable system pressure detection from between 1 bar to 46 bar, which the system 10 software of the electronic control module 22 converts to a psi measurement of between 0 psi to 660 psi. By positioning the transducers 60 on the high pressure side of the air conditioning system compressor 36, and the low pressure side of the compressor, as shown in FIGS. 2 and 5, and electrically connecting the transducers to the electronic control module 22 via wires 64, the electronic control module 22 compares the relative pressures within the system 12 to confirm proper operation. Where the pressures are sensed as high or low, diagnostic information is provided to the system 10 such that the user may view the diagnostic information at the diagnosis screens 34, 34*a*, 34*b*, and take steps to make any necessary repairs, including communicating the system pressures to a diagnostic screen 34*c*.

The present system also enables the user to calibrate the automotive climate control system servo motors 29, 30 and electrically mark and store their settings within the software. Once the climate control systems servo motors are calibrated such that electrical markings between extreme open and closed positions are saved within the software, the software continuously monitors the degree range as well as extreme positions of the servo motors using sensors. If motors move beyond these positions or fail to meet extreme positions during operation, diagnostic software within the electronic control module 22 will transmit and display an error code on the diagnosis screen 34*b* of the GUI on the mobile or electronic device 14, which failure code can be emailed or remotely obtained by a remote technical support team in order to obtain a system repair.

Preset positions of system mode, temperature settings, fan speeds, and mobile device GUI display region of desired color and appearance may also be selected and by a user of the present system 10. Using a preset indicator screen 44 on an electronic device 14, the climate control system 12 saves a snap shot of the position of mode 20 and servo motor positions, temperature screen 24 and temperature servo motor positions, fan blower selection 26 speeds, display colors, such as a screen 46 to change the desired color of the GUI display using a color wheel of 256 RGB colors, and a screen 48 to change the visual appearance of display on the electronic device GUI. These preset positions are saved into the system 10 software memory data for simple one button function using the graphical user interface region 44 via a touch screen of the electronic device 14 for future user selection as a system 12 input using screen 44.

Use of wireless technology connections provides remote technical assistance for diagnosis via a contact screen 50. Remote assistance may be obtained from a technician when the automotive climate control system 12 is connected wirelessly with a mobile device 14 and the mobile device is connected wirelessly over a network or the internet. Instructional video information regarding system 10 operation is provided via "How to" screen 52 Voice commands may also be used to control and adjust the automotive air conditioning system. The system 10 allows inputs of vocal commands spoken into a microphone on the mobile device 14 to control mode 20 locations such as automotive dash mounted vents, dash mounted defrost and floor outlets. Voice commands are also permitted as system inputs to control temperature adjustments such as cold to hot positions 24 and fan blower output from off to high 26. It should be understood that a secure login protocol (as shown in FIG. 1) is provided to limit access to the system 10 except by those with appropriate permissions.

This written description uses examples to disclose the invention and enable a person skilled in the art to make and use the invention. The patentable scope of the invention may include other examples. Additionally, the methods and systems described herein may be implemented on many different types of processing or electronic devices by program code comprising program instructions that are executable by a device processing sub-system. The software program instructions may include source code, object code, machine code, or any other stored data that is operable to cause a processing system to perform the methods and operations described herein. Other implementations may also be used, however, such as the firmware mentioned or even appropriately designed hardware configured to carry out the methods and systems described herein.

The system 10 was developed to control vehicle climate control systems 12 because of complaints that adding physical controls on the vehicle dash cluttered the overall appearance of the historical dashboards. Using simple finger gestures like tapping or swiping on user interface region of a touch screen of an electronic device 14 sends a wireless signal to the users vehicle climate control system 12 to change mode positions such as floor or defrost 20 and change temperature settings 24. The software application for the electronic device 14 has an appearance screen 53 that allows the user to change the color of all the icons to match their vehicles interior via a color wheel. The software application also has two interfaces to choose from. There is a traditional interface with icons that are currently vehicle standards and a futuristic interface that the customer can select. The software application gives multiple user preset settings to control functions of the vehicle climate control system 12, where users can set temperature, fan intensity, and which vents they prefer. A self-diagnostic feature eases troubleshooting. The user can press the diagnostics icon on screen 34 and the system 10 will determine what the problem is and report results to the screens 34a, 34b, 34c. The software application will also gather an error code and inform a remotely located technician of the problem via email, phone or Facebook®, if the user chooses.

The system and method data may be stored and implemented in one or more different types of computer-implemented data stores, such as different types of storage devices and programming constructs (e.g., RAM, ROM, flash memory, flat files, data-bases, programming data structures, programming variables, IF-THEN or similar statement constructs, etc.). It is noted that data structures describe formats for use in organizing and storing data in databases, programs, memory or other computer-readable media for use by a computer program.

The electronic device, wireless technology, computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on electronic devices, a computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "each" does not require "each and every" unless the context clearly dictates otherwise.

We claim:

1. A system for installation within historical vehicles for wirelessly controlling a vehicle climate control system within a historical vehicle without physical controls for the vehicle climate control system with an electronic device having control software using graphical user interface regions, the system including an electronic control module for wirelessly interconnecting with the control software to select desired temperature, fan speed and air outlet locations of the vehicle climate control system; the vehicle climate control system is electrically interconnected to the electronic control module for monitoring and controlling the temperature, velocity and location of air produced from the heating, ventilating and air conditioning components of the vehicle climate control system by physically adjusting the heating, ventilating and air conditioning components using interconnected servo motors pursuant to desired user settings or input instructions received via direct wireless technology provided between the graphical user interface regions of the control software on the electronic device, and the electronic control module.

2. A method for wirelessly controlling a vehicle climate control system installed within a historical vehicle without physical controls for the vehicle climate control system comprising the steps of:
adjusting the temperature of air provided to the historical vehicle by the vehicle climate control system using control software operating on an electronic device touch screen with a temperature graphical user interface region, and wirelessly transmitting the adjustment to an electronic control module in the vehicle climate control system for electrically communicating with the temperature servo motor to physically adjust the temperature control servo motor to provide the desired air temperature;
adjusting the air outlet location mode of the historical vehicle climate control system using the control software operating on the electronic device tough screen with a mode graphical user interface region, and wirelessly transmitting the desired mode to the electronic control module in the vehicle climate control system for electrically communicating with the floor, defrost and/or dash servo motors to physically adjust the floor, defrost and/or dash servo motors to direct air to the desired air outlet location; and
adjusting the fan speed of the vehicle climate control system using the control software operating on the electronic device touch screen with a fan speed graphical user interface region, and wirelessly transmitting the desired fan speed to the electronic control module in the vehicle climate control system for electrically communicating with the fan/blower motor to physically adjust the fan speed of the fan/blower motor to provide the desired fan speed.

3. The method of claim 2 for wirelessly controlling a vehicle climate control system within a historical vehicle without physical controls for the vehicle climate control system further comprising the step of:
diagnosing performance of servo motors within the vehicle climate control system within the historical vehicle using the control software operating on the electronic device touch screen with a diagnostic graphical user interface region by wirelessly transmitting calibration rotation data of the servo motors to the electronic control module in the vehicle climate control system; and
electrically communicating with the servo motors to physically disable a malfunctioning servo motor.

4. The method of claim 2 for wirelessly controlling a vehicle climate control system within a historical vehicle without physical controls for the vehicle climate control system further comprising the step of:
diagnosing performance of a compressor component within the vehicle climate control system within the historical vehicle using the control software operating on the electronic device touch screen with a diagnostic graphical user interface region by wirelessly transmitting compressor activity data to the electronic control module in the vehicle climate control system; and
wirelessly communicating a failure code to the diagnostic graphical user interface region where compressor activity is incorrect.

5. The method of claim 2 for wirelessly controlling a vehicle climate control system within a historical vehicle without physical controls for the vehicle climate control system further comprising the step of:
diagnosing refrigerant pressure within heating and air conditioning components within the vehicle climate control system within the historical vehicle using the control software operating on the electronic device touch screen with a diagnostic graphical user interface region by wirelessly transmitting refrigerant pressures to the electronic control module in the vehicle climate control system; and electrically communicating with the electronic control module when refrigerant pressures are not within acceptable ranges; and disengaging compressor components of the heating and air conditioning components within the vehicle climate control system when refrigerant pressures are not within acceptable ranges; and wirelessly communicating a failure code to the diagnostic graphical user interface region where refrigerant pressures are not within acceptable ranges.

* * * * *